United States Patent [19]
Winter et al.

[11] Patent Number: 5,951,033
[45] Date of Patent: Sep. 14, 1999

[54] FRICTION DAMPER SYSTEM FOR BICYCLE SUSPENSION SYSTEM

[75] Inventors: Mark J. Winter, Scotts Valley, Calif.; Peter G. Turner, Evergreen, Colo.

[73] Assignee: Rockshox, Inc., San Jose, Calif.

[21] Appl. No.: 09/084,139

[22] Filed: May 26, 1998

Related U.S. Application Data

[60] Provisional application No. 60/051,649, Jul. 3, 1997.

[51] Int. Cl.$^6$ ...................................................... B62K 1/00
[52] U.S. Cl. .................... 280/276; 267/141.3; 267/141.7
[58] Field of Search ..................................... 280/276, 277, 280/279, 283; 188/279, 281, 268, 289, 322.17, 322.18; 267/141, 293, 141.3, 141.7

[56] References Cited

U.S. PATENT DOCUMENTS

| | | | |
|---|---|---|---|
| 5,437,436 | 8/1995 | Holson | 267/119 |
| 5,634,653 | 6/1997 | Browning | 280/276 |
| 5,667,234 | 9/1997 | Zirk | 280/279 |

Primary Examiner—Christopher P. Schwartz
Assistant Examiner—C. T. Bartz
Attorney, Agent, or Firm—David W. Hansen; Skadden, Arps, Slate, Meagher & Flom LLP

[57] ABSTRACT

A friction damping system for use in a system having at least one of a pair of sliding elements. The friction damping system has a friction producing element positioned between the sliding elements such that at least one of the sliding elements rubs against the friction producing element to generate friction and thereby damp the relative sliding movement of the sliding elements. The friction producing element may be provided in a housing that is fixed to one of the sliding elements with the friction producing element facing and contacting the other sliding element. The friction damping system may further be designed to provide directional sensitivity such that damping of movement of the sliding elements in a first direction is greater than damping of movement in a second direction opposite the first direction. Such directional sensitivity may be accomplished by angling one of the surfaces against which the friction producing element moves during sliding movement of the sliding elements.

12 Claims, 5 Drawing Sheets

FRICTION DAMPER SYSTEM FOR BICYCLE SUSPENSION SYSTEM

CROSS-REFERENCE TO RELATED PROVISIONAL APPLICATION

The present application claims the benefit of the earlier filing date of pending U.S. Provisional Patent Application Ser. No. 60/051,649, filed Jul. 3, 1997.

BACKGROUND OF THE INVENTION

The present invention relates to a low-cost damping system which improves bicycle suspension performance, and more particularly, controls damping of a bicycle suspension system during both compression and extension of the system.

Suspension systems are used for various applications, such as for cushioning impacts, vibrations, or other disturbances experienced in the operation of vehicles and machinery. Typical applications, for example, include cushioning impacts experienced by bicycles and motorcycles. For example, bicycles have been developed with suspension systems for cushioning impacts or vibrations experienced by the rider when the bicycle contacts bumps, ruts, rocks, pot holes, or other obstacles. Typically, such bicycle suspension systems have been configured for use in the front or rear bicycle fork, in the head tube that connects the front fork to the bicycle frame and handlebars, in the seat post, and in conjunction with a rear wheel swing-arm assembly, as well as in other locations.

Bicycle suspension systems typically include a pair of telescoping elements or tubes which are biased apart by one or more biasing elements, such as coil springs, air springs or elastomer members. The energy generated by an impact to the bicycle is typically stored temporarily by the biasing elements, which are compressed during the impact. These biasing elements may alternatively be arranged within the suspension system to be stretched during impact. However, for purposes of simplicity of the description herein, the biasing elements are hereinafter referred to as "compression members" which are compressed during impact. Much of this stored energy, however, is immediately returned to the system during an expansion of the system in what is known as the "rebound" of the system, during which the compressed or stretched members return to their original size, causing the bicycle to recoil upward and/or downward. Thus, there exists a need to provide damping to control the compression and expansion of the suspension system.

Damping systems, such as hydraulic shock absorbers, are well known in the motorcycle and automobile fields. Damping systems for bicycle suspension systems are also known, such as described in U.S. Pat. No. 5,456,480 to Turner et al., which patent has been assigned to the assignee of the present invention, and is incorporated herein by reference herein in its entirety. Turner specifically discloses a hydraulically damped shock absorber for use in a bicycle fork. Although such systems provide favorable damping characteristics, they can be sophisticated and complicated and thus costly to manufacture. Additionally, although improvements have been made to hydraulic damping systems in order to reduce their weight, and particularly to reduce the weight added by the damping fluid, it would be desirable to provide a still lighter weight system. In particular, it would be desirable to provide a damping system that does not require damping fluid at all. The elimination of damping fluid is also desirable to eliminate the potential for fluid leakage from a damping system utilizing damping fluid. There continues to exist a need for simple, inexpensive and lightweight damping systems suitable for use in bicycle suspension systems.

SUMMARY OF THE INVENTION

One object of the present invention is to provide a simple and inexpensive damping system.

Another object of the present invention is to provide a lightweight, self-contained damping system.

Yet another object of the present invention is to provide a damping system that is not prone to fluid leakage.

Another object of the present invention to provide a simple damping system having a limited number of parts, yet capable of providing compression damping different from rebound damping.

The above and other objects and features of the present invention are accomplished in accordance with the principles of the present invention by providing a damping system preferably having not more than two elements, each element preferably being a single-piece element. In its most general form, the damping control system of the present invention comprises a friction generating device such as an O-ring, arranged to provide friction between two suspension system elements which move or slide with respect to each other during compression and rebound of the suspension system. As applied to a bicycle suspension fork having a pair of legs each formed from a pair of telescoping fork tubes, the two sliding elements may be the two telescoping fork tubes or a plunger movable with respect to one of the fork tubes. In a refinement of this general from of the invention, the O-ring is retained within an O-ring housing, preferably comprising a groove or O-ring gland.

A further refinement of the present invention described below provides "directional sensitivity," i.e., different degrees of friction are generated during the compression and rebound of the suspension fork. Such directional sensitivity is provided either by varying the width of the element that slides within the O-ring, or by providing inclined walls along which the O-ring moves.

The features and advantages of the present invention will be readily apparent from the following detailed description of the preferred embodiment, which makes reference to the several figures of the drawings wherein like reference characters represent like elements, the scope of the invention being set out in the appended claims.

DETAILED DESCRIPTION OF THE INVENTION

Figure 1:
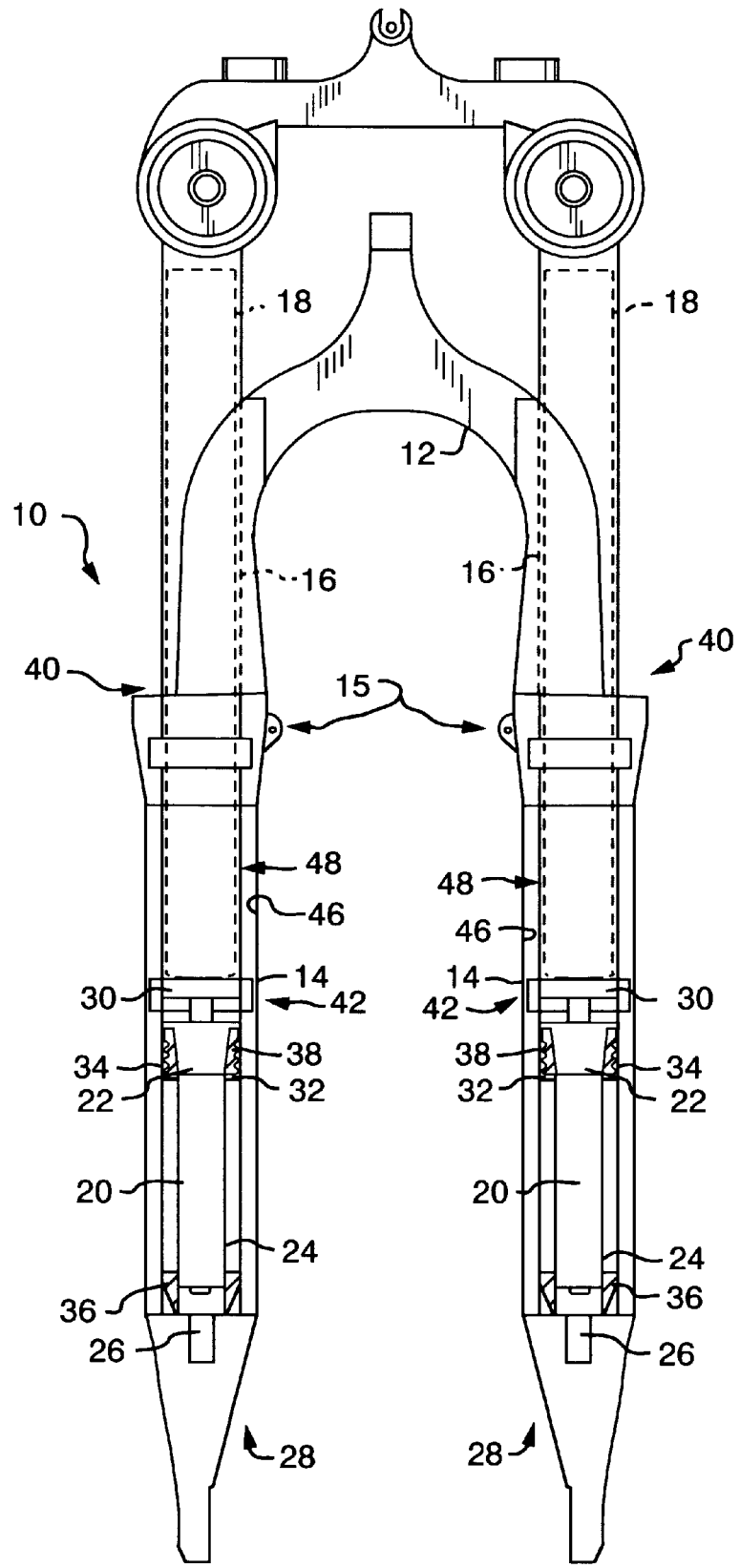
FIG. 1 is an elevational view in cross-section of an exemplary bicycle suspension fork utilizing a friction damping system formed in accordance with the principles of the present invention, the suspension fork being in a neutral configuration.
Figure 2:
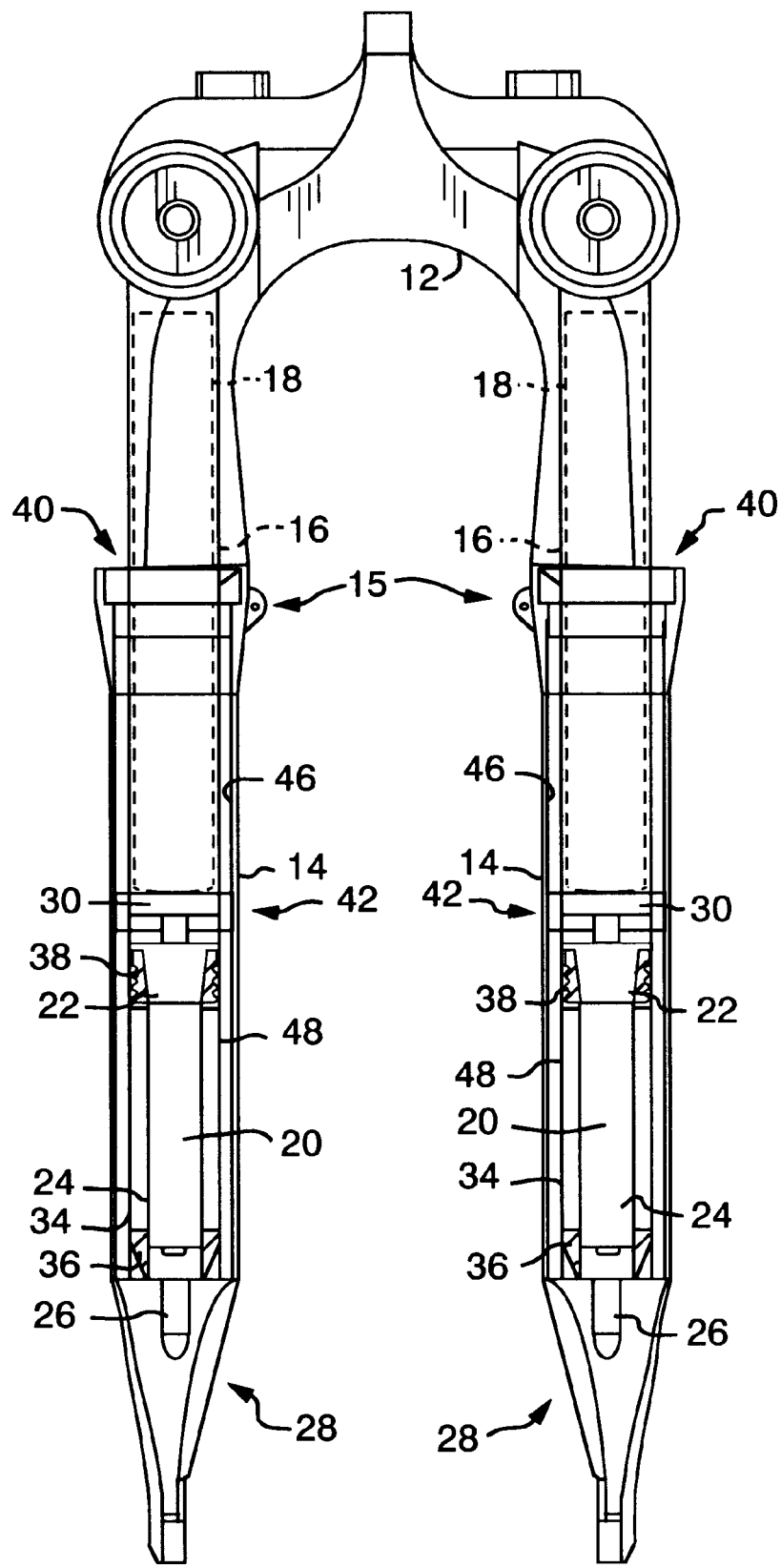
FIG. 2 is a view similar to that of FIG. 1, but with the suspension fork in a compressed configuration.

The present invention is designed to be utilized in bicycle suspension systems having at least two elements that move or slide or telescope with respect to each other, such as, for example, the telescoping elements of suspension fork 10 depicted in FIGS. 1 and 2. Telescoping suspension forks typically comprise a lower fork tube brace 12 holding two spaced apart lower tubes 14. A respective upper tube 16 telescopingly and slidably extends into each of the lower tubes 14 for slidable movement in the vertical direction. Thus, respective pair of tubes 14 and 16 may be considered elements of fork 10 that move or slide or telescope with respect to each other. Because the relative telescoping arrangement of tubes 14, 16 is relevant to the arrangement of the friction damping system of the present invention described below, lower tubes 14 will hereinafter be referred to as outer tubes 14 and upper tubes 16 will hereinafter be referred to as outer tubes 16. However, it will be appreciated that lower tubes 14 may instead be inner tubes slidable within outer, upper tubes 16. Each telescoping assembly makes up a fork leg 15 of suspension fork 10.

A biasing element 18 is positioned in one of fork tubes 14, 16 to bias tubes 14, 16 into a neutral, spaced apart configuration, as shown in FIG. 1, from which the tubes may telescope together (undergo compression) or telescope apart (undergo expansion or rebound). The biasing element 18 may be any type of spring, such as a coil or air spring, or an elastomeric spring such as a microcellular urethane element, that absorbs the energy of impacts to the suspension fork 10 and the bicycle. As described above, these biasing elements absorb energy by compressing during impacts, and release most of the stored energy as they return to their original uncompressed, neutral state during rebound of the fork. Although biasing element 18 is shown positioned within inner tubes 16, it will be appreciated that biasing element 18 instead may be positioned in outer tubes 14 or externally of tubes 14, 16.

A plunger 20 having a first end 22 and a second end 24 is provided within tubes 14, 16 to support and compress biasing element 18. As shown in FIGS. 1 and 2, first end 22 supports biasing element 18 in inner tube 16 and second end 24 is fixed, such as by a plunger bolt 26, to the bottom 28 of outer tube 14. As can be seen in FIGS. 1 and 2, first end 22 of plunger 20 preferably has a flange 30 formed thereon (either as a unitary piece or as a separately attached piece) which cooperates with a shoulder 32 (such as an inwardly extending flange) formed on the lower end 34 of inner tube 16 to prevent first end 22 of plunger 20 from being withdrawn from inner tube 16, thereby preventing outer tube 14, which is coupled to plunger 20, from disengaging completely from inner tube 16.

During compression and rebound, plunger 20 and inner tube 16 are in relative motion, and plunger 20 telescopes into and out of inner tube 16. Thus, plunger 20 and inner tube 16 are another pair of elements of fork 10 that move or slide or telescope with respect to each other. When fork 10 is in an uncompressed or neutral state, shoulder 32 of inner tube 16 is spaced below flange 30 of plunger 20. When fork 10 is in a compressed state, inner tube 16 slides downward toward bottom 28 of outer tube 14 to extend over a larger portion of plunger 20.

Preferably, a bottom-out pad 36 is provided at bottom 28 of outer tube 14 so that inner tube 16 (typically shoulder 32) hits bottom-out pad 36 instead of outer tube 14 upon over-compression. Likewise, a top-out pad 38 is provided between flange 30 and shoulder 32 (preferably fixed below flange 30) so that flange 30 hits top-out pad 38 instead of shoulder 32 upon over-extension. The above-described arrangement of outer tubes 14, inner tubes 16, biasing elements 18, and plungers 20 forms a suspension system 40 for suspension fork 10.

In accordance with the principles of the present invention, a friction producing damping system 42, is provided to generate friction between the slidable elements of suspension fork 10 and damp the movement of suspension system 40. In a preferred embodiment, friction damping system 42 includes an element preferably having a high coefficient of friction such that contact by rubbing or other movement against at least one of the slidable elements of suspension fork 10 will generate friction to damp suspension system 40.

A preferred friction producing element is an O-ring 44 (FIGS. 3, 4, and 8–10) that engages a sliding element of suspension system 40 during compression and expansion of fork 10 to generate friction forces that damp such movements. However, another element producing the same effect, such as another type of elastomeric element may be used instead. In the embodiment of FIGS. 1 and 2, friction damping system 42 is formed around lower end 34 of inner tube 16 such that sliding movement of inner tube 16 during compression and expansion (such that inner tube 16 respectively telescopes into and out of outer tube 14) is damped by the friction producing element of the friction damping system 42.

Figure 3:
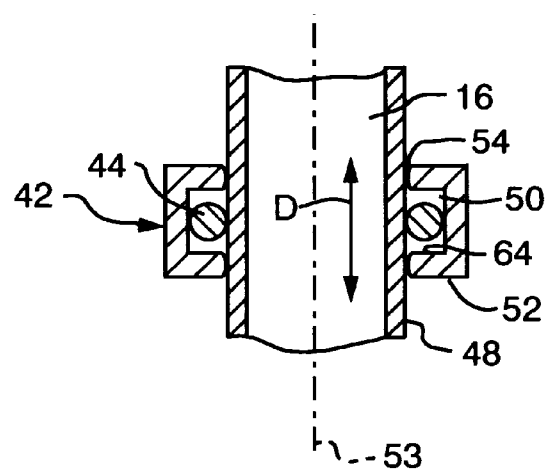
FIG. 3 is an enlarged cross-sectional view of the damping mechanism arrangement of FIGS. 1 and 2 in isolation.

O-ring 44 may be used alone, such that O-ring 44 is fixed directly to outer tube 14 (to interior surface 46) and exterior surface 48 of inner tube 16 rubs against O-ring 44 to create friction damping as tubes 14, 16 move with respect to each other. However, as shown in FIG. 3, O-ring 44 is preferably held within a groove 50 in an annular O-ring housing 52, preferably formed from plastic and made in any desired manner, such as injection molding or machining. Groove 50 in O-ring housing 52 preferably allows O-ring 44 to travel a set distance D in the vertical direction. Preferably, O-ring housing 52 is fixed relative to outer tube 14, allowing inner tube 16 to travel within O-ring 44 during compression and rebound of fork 10. Thus, as an interior element, such as inner tube 16 shown in FIGS. 1 and 2, positioned within interior opening 54 of housing 52, slides in the vertical direction relative to housing 52, O-ring 44 is contacted and damps such movement.

Figure 4:
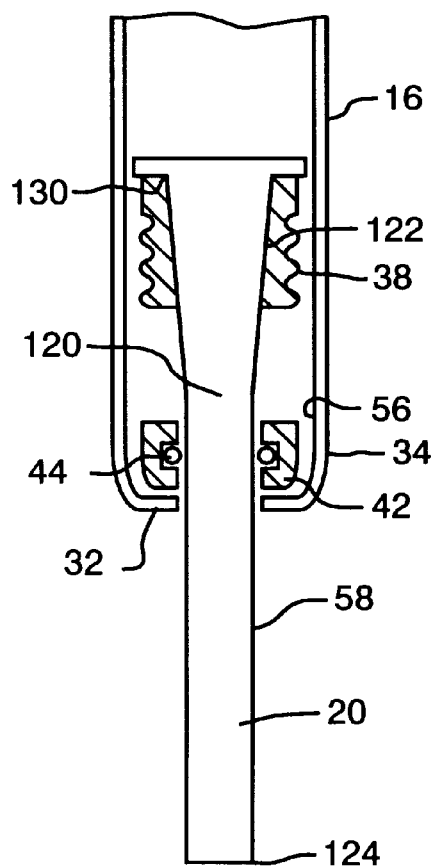
FIG. 4 is an elevational view in cross-section of a portion of a suspension system having a friction damping system similar to that of FIGS. 1–3, but being positioned between a tubular element and a plunger of the suspension system.

Friction damping system 42 may be positioned in another location with respect to the elements of suspension system 40 of suspension fork 10. As shown in FIG. 4, damping system 42 may be positioned between plunger shaft 20 and inner tube 16. O-ring 44 may either be directly fixed to interior surface 56 of inner tube 16 or positioned within an O-ring housing 52 fixed to interior surface 56. O-ring housing 52, if provided, is retained within lower portion 34 of inner tube 16 which extends below upper, first end 22 of plunger shaft 20 when fork 10 is in the neutral configuration. Plunger shaft 20 slides through O-ring 44 and O-ring housing 52 during both compression and rebound. O-ring 44 is held in contact with plunger shaft 20 during this motion, allowing O-ring 44 to rub on the exterior surface 58 of plunger shaft 20, thereby creating friction which damps the motion of plunger shaft 20 and hence compression and expansion of fork 10. It will be appreciated that upon overextension, top-out pad 38 will hit O-ring housing 52 instead of shoulder 32.

Alternate locations or methods for securing friction damping system 42, and particularly O-ring housing 52, relative to suspension system 40 will be apparent to those of skill in the art based on the disclosure herein. For example, although O-ring housing 52 is shown as being fixed relative to an exterior element such that friction damping is effected by the sliding of an interior element through housing 52 and against O-ring 44, friction damping system 42 could be reversed to "fix" O-ring housing 52 relative to an interior element such that an exterior element slides relative to the friction generating element to effect friction damping.

Figure 5:
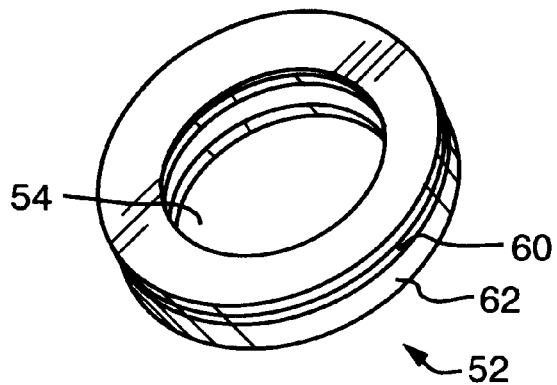
FIG. 5 is a perspective view of a housing for a friction producing element of a friction damping system formed in accordance with the principles of the present invention.
Figure 6:
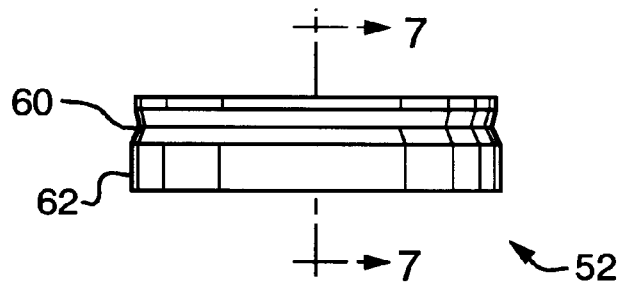
FIG. 6 is a side elevational view of the housing of FIG. 5.
Figure 7:
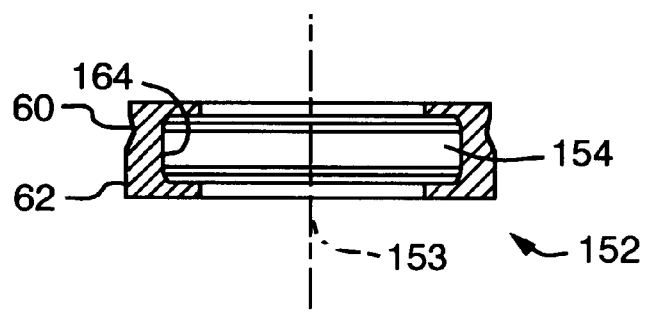
FIG. 7 is a cross-sectional view along line VII—VII of FIG. 6.

O-ring housing 52 is shown in isolation in FIGS. 5–7. As may be appreciated with reference to FIG. 5, O-ring housing 52 is substantially annular with a central opening 54 through which an interior element is passed as described above. Fixing of housing 52 with respect to an exterior element may be accomplished in any desired manner. In the embodiment of FIGS. 5–7, such fixing may be accomplished through the use of a snap ring groove 60 formed on the exterior surface 62 of housing 52. Snap ring groove 60 may fit a snap ring therein that fixes housing 52 to the exterior element.

In the embodiments of FIGS. 1–4, the interior longitudinally extending annular walls 64 (extending along longitudinal axis 53 of O-ring housing 52) of the O-ring housing groove 50 are substantially vertical (parallel to longitudinal axis 53). When the exterior walls of the interior element extending through opening 54 in housing 52 and against which O-ring 44 rubs to effect friction damping are substantially vertical (parallel to longitudinal axis 53), compression and expansion damping are approximately equal. It may be desirable, however, to form a bicycle suspension system which provides greater damping in one direction than in the other.

Accordingly, a further modification of the present invention allows for different amounts of damping during compression than during rebound. The friction damping systems of FIGS. 4 and 8–10 are designed to provide directional sensitivity, i.e., different amounts of friction damping during compression and rebound, in a simple and inexpensive manner. Such directional sensitivity in damping may be accomplished by providing a directional sensitivity mechanism for exerting different pressure on O-ring 44 or other friction producing element depending on the relative motion of the interior element.

FIG. 4 shows one embodiment of a directional sensitivity mechanism formed in accordance with the principles of the present invention. The mechanism of FIG. 4 utilizes a tapered interior element passing through O-ring 44. The interior element of FIG. 4 is plunger shaft 20, modified to have a tapered portion 120 which generally increases in diameter from second end 124 to first end 122 and toward flange 130. As plunger shaft 20 is carried downward during expansion or rebound, the friction exerted by O-ring 44 increases due to the increased diameter of tapered portion 120 toward flange 130. This creates greater friction, thereby further slowing the expansion or rebound of fork 10. As will be apparent to one skilled in the art, these principles may be reversed to provide increased friction during compression of fork 10, instead. Also as noted above, plunger shaft 120 may be substituted with any element of fork 10 that moves relative to O-ring housing 52.

Figure 8:
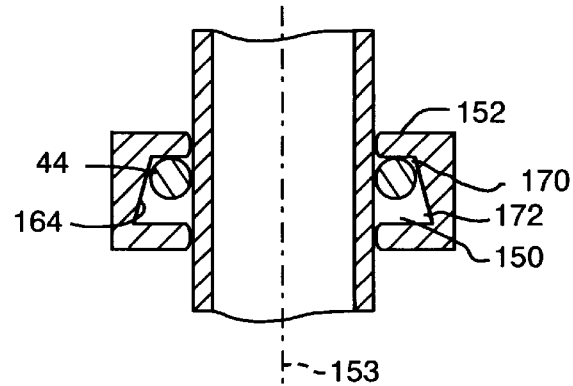
FIG. 8 is an elevational view, in cross-section, of a friction damping system formed in accordance with the principles of the present invention in use in an exemplary suspension system, the friction damping system utilizing a housing similar to that of FIG. 7 and creating increased damping in the suspension system for the illustrated relative movement of suspension system elements.
Figure 9:
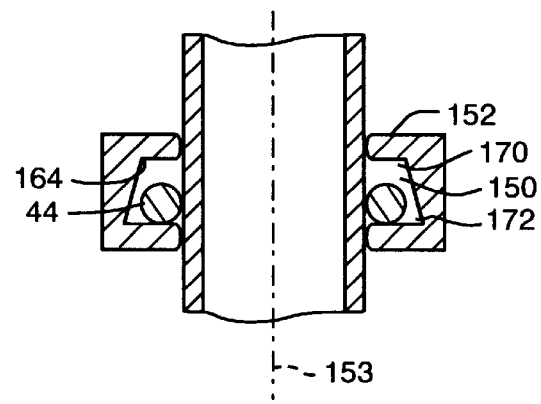
FIG. 9 is a view similar to that of FIG. 8, but showing the suspension system elements moving in the opposite direction and hence being subjected to lower damping than in FIG. 8.
Figure 10:
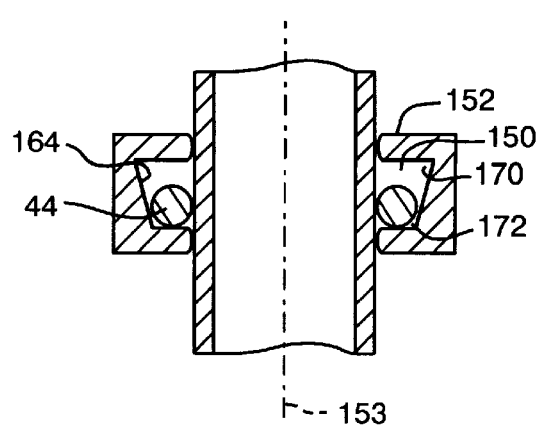
FIG. 10 is a view similar to that of FIGS. 8 and 9, but with the housing arranged to provide either the reverse damping effect of the housing of FIGS. 8 and 9 or a similar damping effect for different moving elements of the suspension system.

Another directional sensitivity mechanism is shown in FIGS. 8–10, in which groove 150 of O-ring housing 152 has a non-vertical annular wall 164 inclined with respect to longitudinal axis 153 of housing 152 (aligned with the longitudinal axis of the suspension system with which housing 152 is used). Because of the incline of annular wall 164, the width of groove 150 varies from a narrow section 170 at one end (narrower than the remaining portion of groove 150) to a wide section 172 at the other end (wider than the remaining portion of groove 150). The interior element that moves through housing 152 has a substantially straight exterior surface parallel to longitudinal axis 153. The angle of annular wall 164 relative to the exterior surface of the interior element thus allows the O-ring 44 to provide different pressure on the interior element depending on the direction of movement of the interior element relative to O-ring housing 152, i.e., during compression or rebound. When the relative motion of the interior element is towards narrow section 170 of groove 150, O-ring 44 is pulled towards narrow section 170. O-ring 44 exerts more pressure on the interior element because of the reduced area in groove 150 for O-ring 44. Hence, increased friction against the interior element and increased damping will result. Likewise, when the interior element slides in the opposite direction, it pulls O-ring 44 towards wide section 172 of groove 150. O-ring 44 has more room at wide section 172 and thus is not pushed against the interior element to the same extent as when O-ring 44 is in narrow section 170. Thus, O-ring 44 exerts less pressure against the interior element when O-ring 44 is in wide section 172, and hence, less friction and reduced damping result.

As noted above, it may be desirable to provide increased damping during either the compression or rebound of the fork. Accordingly, the "orientation" of the incline of O-ring groove annular wall 164 is selected depending on what interior element is passing through O-ring 44 and housing 152, and whether compression or rebound damping should be higher. For example, the orientation of annular wall 164 in FIGS. 8 and 9 (with narrow section 170 above wide section 172) will provide increased damping when the interior element moves upward relative to housing 152, and relatively lower damping as the interior element moves downward. Thus, if the housing 152 of FIGS. 8 and 9 is positioned about inner tube 16, as in FIGS. 1–3, then damping of the rebound stroke of suspension system 40 (schematically illustrated in FIG. 9), during which inner tube 16 moves upward with respect to outer, lower tube 14 and housing 152, will be higher than the damping of the compression strokes (schematically illustrated in FIG. 8) during which inner, upper tube 16 moves downward. However, if the interior element is plunger shaft 20, then compression, which causes plunger 20 to move upwardly with respect to inner tube 16, is damped greater than the rebound.

In contrast, the reversed orientation of annular wall 164 in FIG. 10 (with wide section 172 above narrow section 170)

produces the opposite results. Downward movement of an element positioned through annular opening 160 of housing 152 pulls O-ring 44 into narrower section 170, increasing friction damping, where15 as upward movement of the interior element pulls O-ring 44 into wider section 172, decreasing friction damping. Thus, increased rebound damping is produced by O-ring 44 and housing 152 if the interior element (such as the plunger shaft) moves downward during rebound. If the interior element is inner tube 16, instead, then increased compression damping is produced by the arrangement illustrated in FIG. 10.

It will be appreciated that the incline of annular wall 164 in FIGS. 8–10 is exaggerated. As shown more closely to scale in FIG. 7, the angle of wall 164 is preferably fairly slight and approximately 5° off from the vertical axis 153 of housing 152. It will further be appreciated that if O-ring housing 152 is fixed, to an interior element such that an exterior element slides against O-ring 44, the interior surface of the exterior element would be substantially straight so that the incline of wall 164 would have its desired effect.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A method of damping a suspension system having first and second elements slidably movable with respect to each other, said second element having a tapered portion, said method comprising the steps of:

positioning an O-ring in a groove formed in an annular O-ring housing, and between said first and second slidably movable elements, said O-ring housing having a longitudinal axis and said groove of said O-ring housing having an annular wall extending substantially parallel to said longitudinal axis;

coupling said housing to said first element with said O-ring facing said second element such that movement of said second element relative to said first element causes said second element to rub against said O-ring to generate friction; and positioning said O-ring in said groove and said second element through said annular O-ring housing and said O-ring such that movement of said second element in a first longitudinal direction generates greater friction than movement of said second element in a second longitudinal direction opposite said first longitudinal direction.

2. A method of damping a suspension system having first and second elements slidably movable with respect to each other, said method comprising the steps of:

positioning an O-ring in a groove formed in an annular O-ring housing, and between said first and second slidably movable elements, said O-ring housing having a longitudinal axis and said groove of said O-ring housing having a longitudinally extending annular wall inclined with respect to said longitudinal axis;

coupling said housing to said first element with said O-ring facing said second element such that movement of said second element relative to said first element causes said second element to rub against said O-ring to generate friction; and positioning said O-ring in said groove and said second element through said annular O-ring housing and said O-ring such that movement of said second element in a first longitudinal direction generates greater friction than movement of said second element in a second longitudinal direction opposite said first longitudinal direction.

3. A bicycle suspension fork comprising:

first and second fork legs, each leg having an inner tube telescopingly slidable within an outer tube;

a biasing element within said inner tube of at least one of said fork legs;

a plunger within said at least one fork leg, said plunger having a first end coupled to said outer tube and a second end having a flange supporting said biasing element and slidable within said inner tube; and a damping system comprising a friction producing element comprising an O-ring, said O-ring being positioned between said first and second elements;

wherein:

said fork undergoes compression when said inner tube telescopingly slides into said outer tube such that said plunger slides into said inner tube, and expansion when said inner tube telescopingly slides out of said outer tube such that said plunger slides out of said inner tube;

said damping system further comprises an annular O-ring housing having a groove defined therein and a longitudinal axis;

said O-ring is positioned in said groove and movable along said longitudinal axis within said groove as said inner tube and said plunger move with respect to each other;

said inner tube has an interior surface;

said O-ring housing is fixed to said interior surface of said inner tube;

said plunger passes through said annular O-ring housing for slidable movement therethrough;

said groove of said O-ring housing and said O-ring face said plunger such that slidable movement of said plunger with respect to said inner tube causes said plunger to rub against said O-ring and generate friction to damp compression and expansion of said fork;

said plunger has a tapered portion adjacent said second end of said plunger; and slidable movement of said plunger with respect to said inner tube causes said tapered portion to move along said O-ring to vary the degree to which said O-ring rubs against said tapered portion and thereby to vary the friction generated thereby.

4. A bicycle suspension fork comprising:

first and second fork legs, each leg having an inner tube telescopingly slidable within an outer tube;

a biasing element within said inner tube of at least one of said fork legs;

a plunger within said at least one fork leg, said plunger having a first end coupled to said outer tube and a second end having a flange supporting said biasing element and slidable within said inner tube; and a damping system comprising a friction producing element comprising an O-ring, said O-ring being positioned between said first and second elements;

wherein:

said fork undergoes compression when said inner tube telescopingly slides into said outer tube such that said plunger slides into said inner tube, and expansion when said inner tube telescopingly slides out of said outer tube such that said plunger slides out of said inner tube;

said damping system further comprises an annular O-ring housing having a groove defined therein and a longitudinal axis;

said O-ring is positioned in said groove and movable along said longitudinal axis within said groove as said inner tube and said plunger move with respect to each other;

said inner tube has an interior surface;

said O-ring housing is fixed to said interior surface of said inner tube;

said plunger passes through said annular O-ring housing for slidable movement therethrough;

said groove of said O-ring housing and said O-ring face said plunger such that slidable movement of said plunger with respect to said inner tube causes said plunger to rub against said O-ring and generate friction to damp compression and expansion of said fork;

said groove of said O-ring housing has a longitudinally extending annular wall inclined with respect to said longitudinal axis of said O-ring housing such that said groove has a width varying from a narrow portion at a first end to a wide portion at a second end; and slidable movement of said plunger with respect to said O-ring housing and said inner tube causes said O-ring to move between said narrow portion and said wide portion to vary the degree to which said O-ring rubs against said plunger and thereby to vary the friction generated thereby.

5. A bicycle suspension fork as in claim 4, wherein said O-ring housing is positioned with said inclined annular wall oriented such that expansion of said fork is damped to a greater degree than compression.

6. A damping system for use in damping a suspension system having first and second elements slidably movable with respect to each other, said damping system comprising:

an O-ring positioned between said first and second elements such that relative movement of said first and second elements causes at least one of said elements to rub against said O-ring to generate friction and thereby damp said suspension system; and an annular O-ring housing having a groove defined therein and a longitudinal axis, said annular O-ring housing being positioned adjacent said interior surface of said first element and fixed to one of said first and second elements;

wherein:

said O-ring is housed in said groove of said O-ring housing, said groove and said O-ring is positioned such that one of said first and second elements rubs against said O-ring to damp said suspension system as said first and second elements move with respect to each other;

said O-ring is movable within said groove of said O-ring housing along said longitudinal axis of said O-ring housing as said first and second elements move with respect to each other;

said first element is tubular and having an interior surface;

said second element is telescopingly positioned within said first tubular element and passes through said annular O-ring housing and said O-ring for slidable movement therethrough;

said groove of said O-ring housing has a longitudinally extending annular wall inclined with respect to said longitudinal axis of said O-ring housing such that said groove has a width varying from a narrow portion at a first end to a wide portion at a second end; and slidable movement of said first and second elements causes said O-ring to move between said narrow portion and said wide portion to vary the degree to which said O-ring rubs against said other of said first and second elements and thereby to vary the friction generated thereby.

7. A damping system as in claim 6, wherein:

said first tubular element has an interior surface;

said second element has a substantially straight exterior surface parallel to said longitudinal axis of said O-ring housing; and said O-ring housing is fixed to said interior surface of said first element with said groove and O-ring facing said exterior surface of said second element for contact of said O-ring therewith.

8. A damping system as in claim 7, wherein:

said first element is the lower tube of a bicycle suspension fork leg;

said second element is the upper tube of a bicycle suspension fork leg;

said O-ring housing is positioned such that said narrow portion of said groove is above said wide portion of said groove; and said suspension system undergoes compression as said second element moves downward relative to said first element and expansion as said second element moves upward relative to said second element such that expansion damping is higher than compression damping.

9. A damping system as in claim 7, wherein:

said first element is the upper tube of a bicycle suspension fork leg;

said second element is a plunger coupled to the lower tube of a bicycle suspension fork leg and telescopingly slidable within said upper tube;

said O-ring housing is positioned such that said narrow portion of said groove is below said wide portion of said groove; and said suspension system undergoes compression as said plunger moves upward relative to said upper tube and expansion as said plunger moves downward relative to said upper tube such that expansion damping is higher than compression damping.

10. A damping system for use in damping a suspension system having first and second elements slidably movable with respect to each other, said damping system comprising:

an O-ring positioned between said first and second elements such that relative movement of said first and second elements causes at least one of said elements to rub against said O-ring to generate friction and thereby damp said suspension system; and an annular O-ring housing having a groove defined therein and a longitudinal axis, said annular O-ring housing being positioned adjacent said interior surface of said first element and fixed to one of said first and second elements;

wherein:

said O-ring is housed in said groove of said O-ring housing, said groove and said O-ring are positioned such that one of said first and second elements rubs against said O-ring to damp said suspension system as said first and second elements move with respect to each other;

said O-ring is movable within said groove of said O-ring housing along said longitudinal axis of said O-ring housing as said first and second elements move with respect to each other;

said first element is tubular and having an interior surface;

said second element is telescopingly positioned within said first tubular element and passes through said annular O-ring housing and said O-ring for slidable movement therethrough;

said groove of said O-ring housing has a longitudinally extending annular wall substantially parallel to said longitudinal axis of said O-ring housing;

said first element is the upper tube of a bicycle suspension fork leg comprising an upper tube slidably movable with respect to a lower tube;

said second element is a plunger having a first end coupled to the lower tube of the bicycle suspension fork leg and a second end telescopingly slidable within said upper tube;

said upper tube has an interior surface;

said O-ring housing is fixed to said interior surface of said upper tube with said plunger passing through said O-ring housing, said groove facing said plunger;

said plunger has a tapered portion adjacent said second end of said plunger; and slidable movement of said plunger with respect to said upper tube causes said tapered portion of said plunger to move along said O-ring to vary the degree to which said O-ring rubs against said tapered portion and thereby to vary the friction generated thereby.

11. A bicycle suspension fork comprising:

first and second legs, at least one of said legs having an outer tube, and an inner tube telescopingly slidably positioned within said outer tube, slidably movable with respect to each other; and a damping system comprising a friction producing element comprising an O-ring, said O-ring being positioned between said first and second elements; and an annular O-ring housing having a groove defined therein and a longitudinal axis;

wherein;

slidable movement of said outer and inner tubes with respect to each other causes at least one of said tubes to rub against said O-ring to damp said movement;

said fork undergoes compression when said inner tube telescopingly slides into said outer tube and expansion when said inner tube telescopingly slides out of said outer tube;

said O-ring is positioned in said groove and movable along said longitudinal axis within said groove as said outer and inner tubes move with respect to each other;

said outer tube has an interior surface;

said O-ring housing is fixed to said interior surface of said outer tube;

said inner tube passes through said annular O-ring housing for slidable movement therethrough;

said groove of said O-ring housing and said O-ring face said inner tube such that slidable movement of said inner tube with respect to said outer tube causes said inner tube to rub against said O-ring and generate friction to damp compression and expansion of said fork;

said groove of said O-ring housing has a longitudinally extending annular wall inclined with respect to said longitudinal axis of said O-ring housing such that said groove has a width varying from a narrow portion at a first end to a wide portion at a second end; and slidable movement of said inner tube with respect to said O-ring housing and said outer tube causes said O-ring to move between said narrow portion and said wide portion to vary the degree to which said O-ring rubs against said other of said outer and inner tubes and thereby to vary the friction generated thereby.

12. A bicycle suspension fork as in claim 11 wherein said O-ring housing is positioned with said inclined annular wall oriented such that expansion of said fork is damped to a greater degree than compression.

* * * * *